United States Patent
McCloy

(10) Patent No.: US 8,667,600 B2
(45) Date of Patent: Mar. 4, 2014

(54) TRUSTED COMPUTING SOURCE CODE ESCROW AND OPTIMIZATION

(75) Inventor: Ian J. McCloy, Salford (GB)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 13/174,259

(22) Filed: Jun. 30, 2011

(65) Prior Publication Data

US 2013/0007889 A1 Jan. 3, 2013

(51) Int. Cl.
*G06F 7/04* (2006.01)
*G06F 17/30* (2006.01)
*H04N 7/16* (2011.01)
*G06F 15/16* (2006.01)
*H04L 29/06* (2006.01)

(52) U.S. Cl.
USPC .................................. 726/26; 726/6; 717/159

(58) Field of Classification Search
USPC ............................................ 726/6; 717/159
See application file for complete search history.

(56) References Cited

U.S. PATENT DOCUMENTS

| | | | |
|---|---|---|---|
| 6,063,134 A * | 5/2000 | Peters et al. ................... | 717/176 |
| 6,684,389 B1 | 1/2004 | Tanaka | |
| 2002/0067833 A1 | 6/2002 | Han et al. | |
| 2009/0063867 A1 | 3/2009 | Granados et al. | |
| 2009/0138863 A1 | 5/2009 | Lu et al. | |
| 2011/0167498 A1* | 7/2011 | Wilson ............................ | 726/27 |
| 2012/0174186 A1* | 7/2012 | Aziz et al. ......................... | 726/1 |

* cited by examiner

*Primary Examiner* — Shin-Hon Chen
(74) *Attorney, Agent, or Firm* — DeLizio Gilliam, PLLC

(57) ABSTRACT

A software installation package includes encrypted source code. An installer receives an encryption key for decrypting the encrypted source code. The installer further causes the establishment of a temporary virtual machine. The encrypted source code is decrypted, using the encryption key, on the temporary virtual machine. A compiler executing on the temporary virtual machine compiles the source code into an application. The application is transferred from the temporary virtual machine to an operating environment. The temporary virtual machine is then destroyed, thereby also destroying any decrypted copies of the source code.

25 Claims, 4 Drawing Sheets

TRUSTED COMPUTING SOURCE CODE ESCROW AND OPTIMIZATION

BACKGROUND

Embodiments of the inventive subject matter generally relate to the field of computer systems, and, more particularly, to trusted computer source code escrow.

Commercial closed source software typically has the limitation that it is built and compiled for a target platform and is constrained to whatever platform the compiler at the time the source code is compiled was targeted for. This means a compiled Intel x86 binary will not run on a Power system. Alternatively, in the case of new revisions of an existing architecture the compiler uses whatever platform features are available at the time. This generally results in binary code that does not utilize features unique to platforms that appear subsequent to the time the source code was compiled. When a customer wants to purchase new servers, whether it's a whole new architecture (i.e. moving from an Intel x86 architecture to Power) or a new revision of the same architecture (i.e. moving from Power6 to Power7), there is an inherent problem with what to do with the existing software and workloads. Traditionally customers are forced to purchase new software and perform any migration and conversions of application data necessary to utilize the new software, if indeed it is available.

Another issue is that software is built using compiling options designed for a general audience, attempting to satisfy the needs of the widest scope of customers. This will exclude some customers from implementing an optimized solution when a simple re-compile could produce an application tailored to the hardware or software environment actually used by the customer.

A further issue arises when a software supplier no longer supports a product, be it 'end of life' or indeed the supplier is no longer in business. In such cases the customer can get stuck with software which only runs on legacy platforms where important updates such as security fixes are no longer available. The traditional approach to this is to use a source code escrow, where the supplier will hold the source code for a product in escrow with a third party in the event it needs to be retrieved at a later date given certain triggers in the agreement with the customer. This traditional approach has many shortcomings. First, the cost of writing up legal agreements for each customer's needs and holding software source code in escrow is very expensive with recurring costs not to mention time consuming and complicated. Second, the source code is not available to customers until a worst case scenario, as it will contain trade secrets which will be exposed as soon as the customer takes possession of the source code. Third, there is no guarantee the customer can actually do anything with the source code without spending a great deal of time, effort and money to utilize it.

SUMMARY

Embodiments of the inventive subject matter include a software installation package that includes encrypted source code. An installer receives an encryption key for decrypting the encrypted source code. The installer further causes the establishment of a temporary virtual machine. The encrypted source code is decrypted, using the encryption key, on the temporary virtual machine. A compiler executing on the temporary virtual machine compiles the source code into an application. The application is transferred from the temporary virtual machine to an operating environment. The temporary virtual machine is then destroyed, thereby also destroying any decrypted copies of the source code.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The embodiments provide systems and methods to build or rebuild an application from a trusted source code escrow. A software vendor provides encrypted source code as part of an installation package. The encrypted source code is transferred, in encrypted form, to a temporary virtual machine that is created for the purpose of compiling the source code into an application. The compiler compiles the source code on the temporary virtual machine. The resulting application is then transferred to storage or machines that are accessible to the end-user. After the transfer, the temporary virtual machine is destroyed, resulting in the destruction of any unencrypted copies of the source code. During the process, the end-user does not have access to the temporary virtual machine. As a result, the end-user does not have access to any unencrypted copies of the source code, thereby protecting the source code maker from unintended disclosure of the source code.

Figure 1:
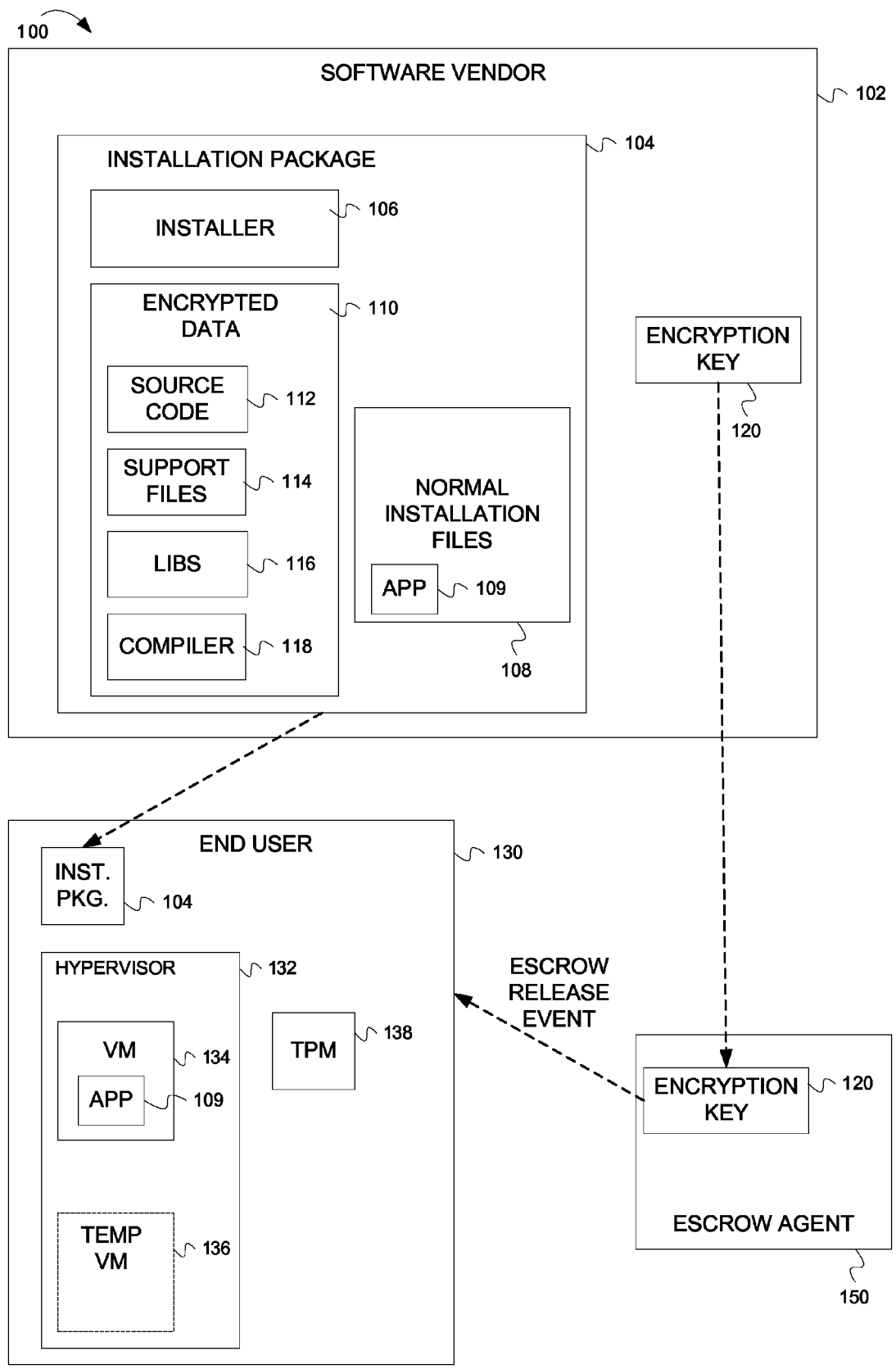
FIG. 1 depicts an example system configured to provide trusted source code escrow.

FIG. 1 depicts an example system 100 configured to provide trusted source code escrow. System 100 includes software vendor environment 102, end-user environment 130, and optionally an escrow agent 150. Software vendor environment 102 comprises systems used to make and distribute software. In some embodiments, a software application made or distributed by a software vendor is included in an installation package 104. Installation package 104 includes an installer 106, normal installation files 108 and encrypted data 110. Installer 106 is a program that is used by an end-user to install the application software on the end-user's systems so that the end-user can use the application. Normal installation files 108 are the file or files for the application that are installed in a normal or customary installation. Such files are typically executable object code files that are produced by compilation of the source code for the application by the software vendor or maker. The installer 106 and the normal installation files 108 are generally not encrypted, or encrypted with a key that is provided to the end-user upon purchase of the software.

Encrypted data 110, in some embodiments, includes source code 112, support files 114, libraries 116 and may also include compiler 118. Source code 112 is the programming language source code that defines the programming logic and data structures for an application 109. Source 112 may be any type of source code, including C, C++, assembler, Java etc. The embodiments are not limited to any particular type of source code. Libraries 116 are support libraries of object code that are used by the application to provide predefined functions such as interfaces with operating systems, user interfaces, device interfaces, commonly used math or transformation routines, security functions etc. Support files 114 comprise files that are used to build an application 109 use source code 112 and libraries 116. Such files include files that identify source code files and library files to include in an application, provide compiler options to use for compiling source code 112, and other files that are used to build an application, but not necessarily required to run the application. An example of such a support file is a "makefile", which provides rules to determine how an application is built for the source code and libraries used by the application.

In some embodiments, encrypted data 110 optionally includes a compiler 118 for compiling source code 112. Various compilers may be included in encrypted data 110 depending on the software and hardware environments that are to be supported for an application. For example, compilers for Intel processors and PowerPC processors may be provided. Further, compilers for particular target operating systems such as Windows, Mac OS, or Linux operating systems may be included.

Encrypted data 110 is encrypted using one or more encryption keys 120. In general, any form of encryption now known or developed in the future may be used to perform the encryption. The choice of a particular encryption methodology will depend on the strength of the encryption desired by the vendor to protect the trade secrets in the application or the market value of the application.

In some embodiments, the software vendor provides encryption key 120 to an escrow agent 150. Further, the software vendor may provide the escrow agent with information describing the conditions or events upon which the encryption key is released to an end-user. The software vendor may electronically transmit the encryption key 120 to an escrow agent 150. Escrow agent 150 then holds the key until an escrow release event or condition occurs.

An end-user, for example, a purchaser or licensee of an application, acquires the installation package 104 and installs the application in the end-user environment 130. End-user environment 130 includes a system or systems that are supported by the installed application. In some embodiments, the end-user environment includes a hypervisor 132 that manages one or more virtual machines. Hypervisor 132 may also be referred to as a virtual machine manager. During normal installation, the end-user runs installer 106 from installation package 104, which installs a pre-built version of the application from normal installation files 108. In the example illustrated in FIG. 1, application 109 has been installed in VM (virtual machine) 134.

At some point in time after installation of application 109, the end-user may desire to modify application 109. For example, the end-user may desire to retarget application 109 for a different hardware or software environment, upgrade application 109 or optimize application 109. In order to perform such a modification, the end-user obtains encryption key or keys 120. In some embodiments, the end-user obtains the encryption key 120 from escrow agent 150 upon the occurrence of an event that triggers the release of the encryption key 120. Examples of such events include, but are not limited to the software vendor going out of business or ceasing support of application 109. Alternatively, the end-user may obtain the encryption key 120 from the software vendor if the software vendor is willing to provide the encryption key 120 to the end-user.

In order for the end-use to rebuild application 109, installer 106 is invoked and directed to rebuild application 109 using source code 112 and other files in encrypted data 110. For example, an installation switch or user interface option may be provided to direct the installer to use the files in encrypted data 110 to rebuild application 109.

Installer 106 creates a temporary virtual machine 136. A temporary VM may be referred to as a system only virtual machine or adjunct virtual machine. The encrypted data is transferred to temporary VM 136 along with the encryption key 120. In some embodiments, temporary VM 136 is a copy of an environment provided by preexisting VM 134. The temporary VM is created such that the end-user cannot access the memory or other resources of temporary VM 136.

The source code 112 along with support files 114, libraries 116 and compiler 118 are decrypted on temporary VM 136. The compiler is invoked on to build a new version of application 109 temporary VM 136. The newly rebuilt application is then transferred from the temporary VM 136 to the end-user's normal operating environment, for example VM 134.

After transferring the application, the temporary VM 136 is destroyed, resulting in the destruction of the decrypted source code, libraries and other files extracted from encrypted data 110. Because the end-user does not have access to temporary virtual machine 136 during the application build process, the end-user cannot access the source code in its decrypted form.

In some embodiments, end-user environment 130 includes a trusted platform module (TPM) 138. TPM 138 verifies that the temporary VM 136 is authentic and has not been altered. In some embodiments, TPM 138 is used as part of a trusted boot of the temporary virtual machine. Trusted boot is a procedure for booting and establishing a chain of trust in a computing system. Components of the boot are cryptographically measured by TPM 138 and then the measurements stored in TPM 138. In general, each component measures the next boot component. This measurement is taken and stored before control is transferred to the measured component. Once the system is running the chain of trust can be extracted for inspection by a remote system using a remote attestation procedure e.g. DAA (Direct Anonymous Attestation). In some embodiments, TPM 138 comprises dedicated hardware for performing trust measurements. In alternative embodiments, TPM 138 may be a virtual TPM (VTPM).

Figure 2:
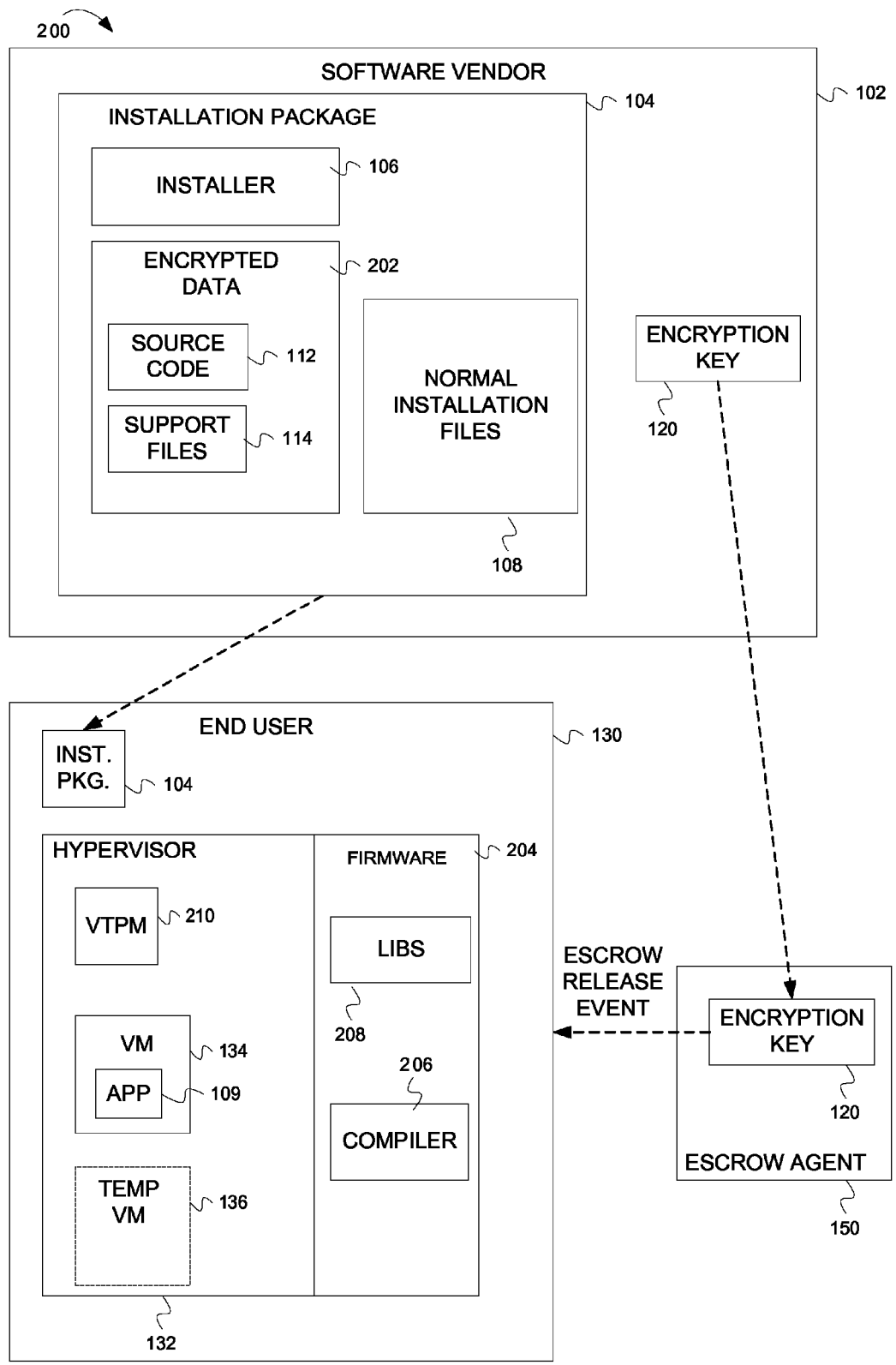
FIG. 2 depicts an alternative example system configured to provide trusted source code escrow.

FIG. 2 depicts an alternative example system 200 configured to provide trusted source code escrow. Similar to system 100 described above, system 200 includes software vendor environment 102, end-user environment 130, and optionally an escrow agent 150. In the example illustrated in FIG. 2, firmware 204 in end-user environment 130 includes a compiler 206 and optionally libraries 208 that may be used to rebuild an application 109. In such example embodiments, encrypted data 202 includes source code 112 and support files 114, but does not necessarily include libraries 116 or compiler 118 as the libraries and compiler are provided in firmware 204.

In addition, FIG. 2 illustrates that in some embodiments, a virtual TPM 210 insures the authenticity and integrity of firmware 204 and temporary VM 136. In some embodiments, VTPM 210 utilizes a process where each step authenticates that the software and/or data used in the next step has not been altered and provides attestation that the software used at each step of the boot or initialization process was not altered.

Further details on the operation of the above-described systems are provided below with reference to FIG. 3.

Figure 3:
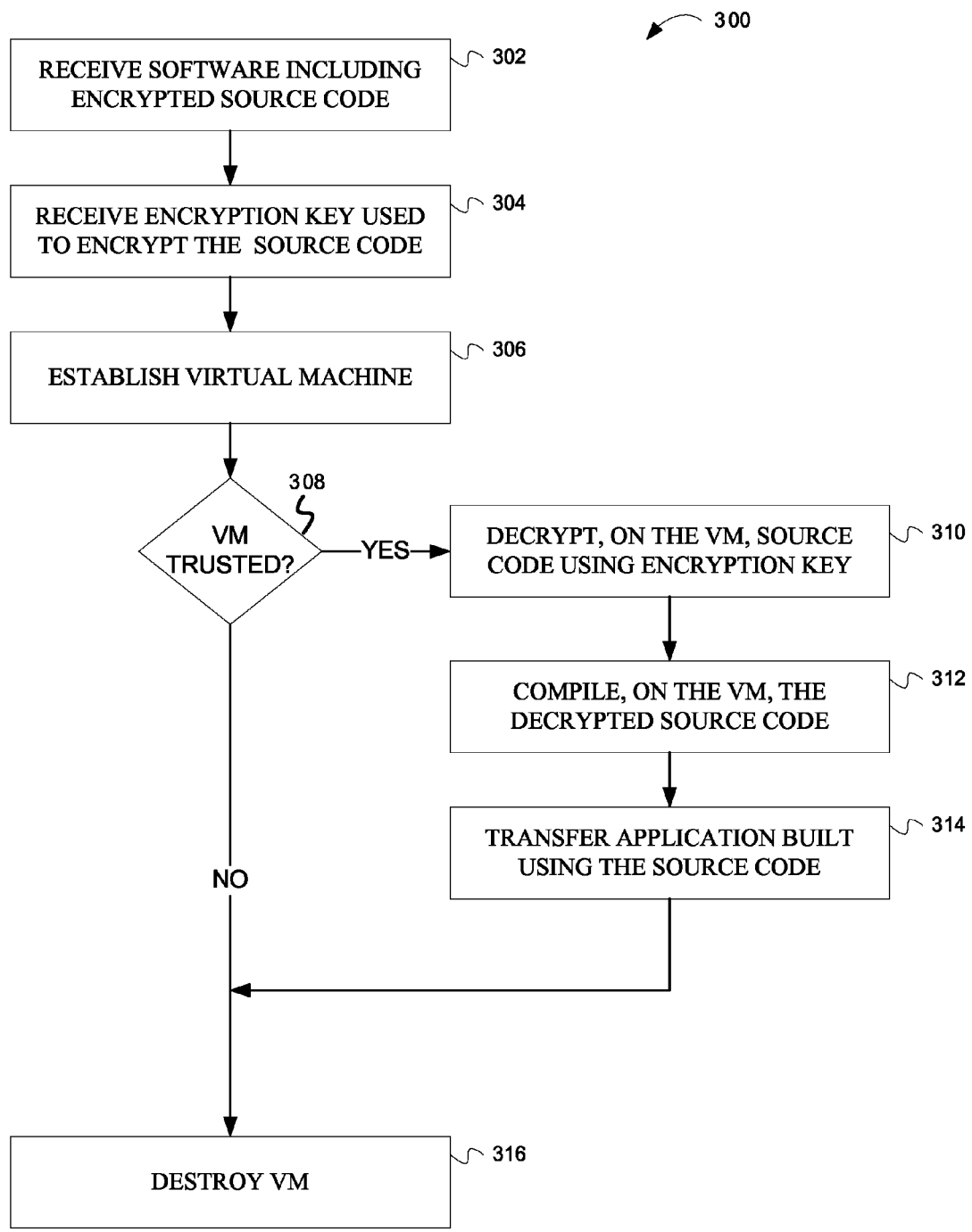
FIG. 3 depicts a flow chart of a method for providing trusted source code escrow.

FIG. 3 depicts a flow chart of a method 300 for providing trusted source code escrow. For example purposes, operations associated with the blocks in FIG. 3 will be described as being performed by a product tracking system ("system"), which may, for example, include any or all of the elements described in FIG. 1, FIG. 2 and/or FIG. 4. FIG. 3 illustrates a flow 300 that the system can perform.

The method begins at block 302, where an end-user system receives a software installation package including encrypted source code. The software installation package may also include various combinations of encrypted support files, encrypted libraries, or encrypted compilers or other executable files. The software installation package may be received, for example, from a storage device or over a network.

At block 304, the end-user system receives an encryption key. The encryption key is one that is used to decrypt the source code and other files that were encrypted in the software installation package received at block 302. In some embodiments, the encryption key is received electronically over a network, such as in an email message or other electronically transmitted message. For example, the decryption key may be received from an escrow agent in response to an escrow release event. An escrow release event may include, but is not limited to, the end of support for the application provided in the software installation package, the vendor or maker of the application ceasing to do business, a predetermined amount of time, or other event.

At block 306, the end-user system creates a temporary virtual machine. The temporary virtual machine is created such that the end-user does not have access to the temporary virtual machine. In some embodiments, the temporary virtual machine is a system only virtual machine that runs an operating system and operating system support programs, but does not run any extraneous applications. The temporary virtual machine may be a copy of an operating system for a virtual machine that hosts a current version of an application in the installation package.

At block 308, the end-user system determines if the temporary virtual machine is trusted. A trusted virtual machine is a virtual machine that has been determined to be authentic and unaltered from a known configuration. In some embodiments, applications provided for execution on the virtual machine, such as a compiler, are also checked for authenticity and integrity. In further alternative embodiments, firmware that includes a compiler or other support programs is checked for authenticity and integrity. A trusted platform module is used in some embodiments to check authenticity and integrity of the various components used to build an application.

If the check at block 308 determines that the temporary virtual machine is trusted, then at block 310 the source code for the application, along with any other support files, library files or compilers used to build the application are decrypted by the temporary virtual machine into memory or storage accessible only by the temporary virtual machine.

At block 312, a compiler executing on the temporary virtual machine compiles the source code into an application. In some embodiments, the compiler is included in the encrypted portion of an installation package. In alternative embodiments, the compiler is resident in firmware accessible by the temporary virtual machine. In such embodiments, a TPM or VTPM may be used to verify the authenticity and integrity of the compiler.

The compiler may be run using options or predefined combinations of options that are specified or selected by the end-user. In some embodiments, the options or combinations of options are specified or selected using the installer program. For example, compiler options may be presented that perform certain optimizations appropriate for the end-user's hardware environment or generate code for a particular target hardware environment. For example, an end-user may specify that the compiler is to generate code that uses more memory to increase performance when the end-user's hardware includes sufficient amounts of memory to make such optimizations worthwhile. In some embodiments, the options made available to a user through the installer may be limited to options or combinations of options that have been predetermined by the software vendor or maker.

At block 314, the newly built application is transferred to a component of the end-user operating environment that is accessible to the end-user. For example, the application can be transferred to another virtual machine. In some embodiments, the application may be transferred to another virtual machine using secure communications channels. Alternatively, the temporary virtual machine may expose a network file system on which the newly built application is stored. Other virtual machines can access the network file system exposed by the temporary virtual machine to retrieve copies of the newly built application, but are prevented from accessing other storage on the temporary virtual machine that may have unencrypted copies of the source code.

At block 316, the temporary virtual machine is destroyed. Destruction of the temporary virtual machine also destroys any unencrypted copies of the source code, support files, libraries, and compilers etc. that were present on the virtual machine.

The depicted flowchart is provided as an example to aid in understanding embodiments, and should not be used to limit embodiments. Embodiments can perform additional operations, fewer operations, operations in parallel, operation in a different order, etc.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
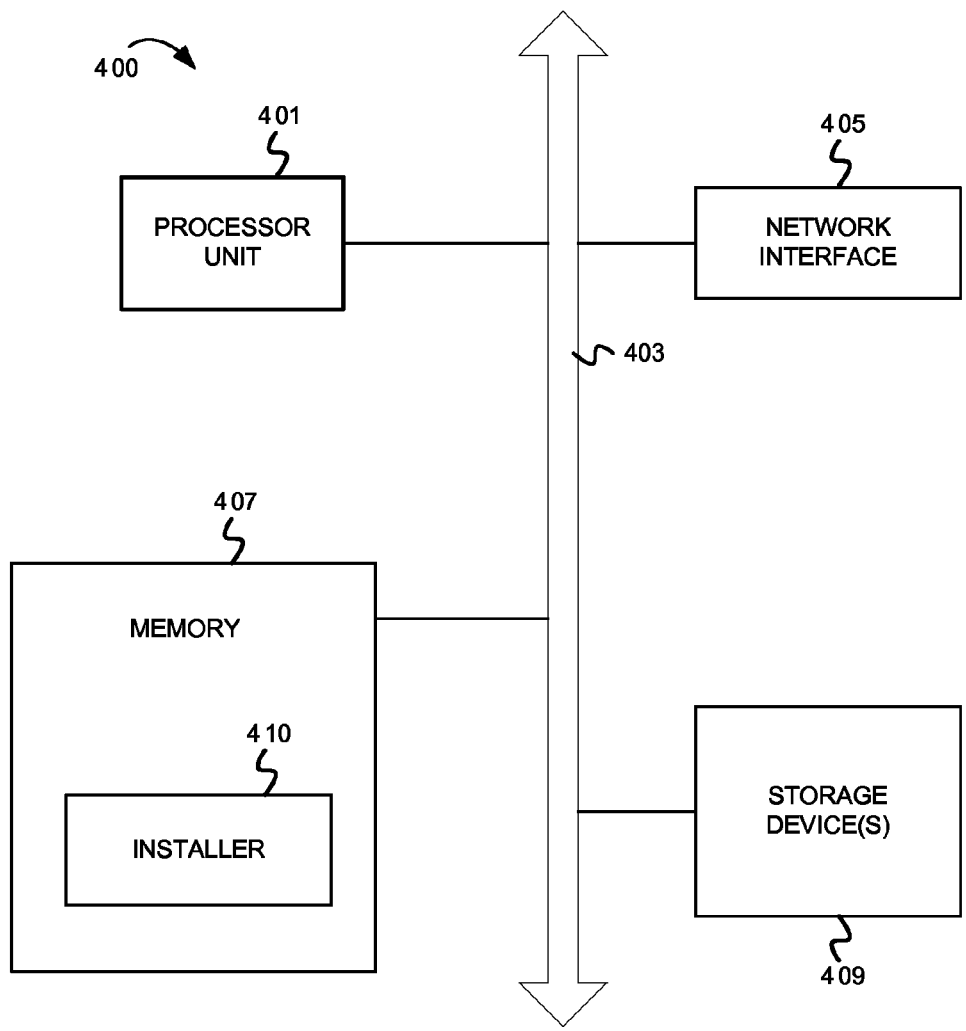
FIG. 4 depicts components of an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 embodies functionality to implement embodiments described above. The system memory 407 may include one or more functionalities such as installer 410 that facilitate the method of building an application using trusted escrow as described above. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques building an application using trusted source code escrow as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving a software installation package, the software installation package including encrypted source code;
   receiving an encryption key for decrypting the encrypted source code;
   establishing a temporary virtual machine;
   decrypting, on the temporary virtual machine, the encrypted source code using the encryption key to create decrypted source code;
   compiling, on the temporary virtual machine, the decrypted source code to create an application;
   transferring the application to an operating environment; and
   destroying the temporary virtual machine.

2. The method of claim 1, wherein the software installation package further includes an encrypted compiler, and wherein compiling, on the temporary virtual machine, includes:
   decrypting the encrypted compiler on the temporary virtual machine to create a decrypted compiler; and
   compiling the source code using the decrypted compiler.

3. The method of claim 1, and further comprising verifying the authenticity and integrity of the temporary virtual machine prior to decrypting the encrypted source code.

4. The method of claim 3, wherein verifying the authenticity and integrity of the temporary virtual machine includes receiving attestation of a boot process for the temporary virtual machine from a trusted platform module.

5. The method of claim 1, and further comprising receiving the encryption key from an escrow agent in response to an escrow release event.

6. The method of claim 1, and further comprising copying a preexisting virtual machine to the temporary virtual machine.

7. A computer program product for building an application from encrypted source code, the computer program product comprising:
   a non-transitory computer readable storage medium having computer usable program code embodied therewith, the computer usable program code comprising a computer usable program code configured to:
   receive a software installation package, the software installation package including encrypted source code;
   receive an encryption key for decrypting the encrypted source code;
   establish a temporary virtual machine;
   decrypt, on the temporary virtual machine, the encrypted source code using the encryption key to create decrypted source code;
   compile, on the temporary virtual machine, the decrypted source code to create an application;
   transfer the application to an operating environment; and
   destroy the temporary virtual machine.

8. The computer program product of claim 7, wherein the software installation package further includes an encrypted compiler, and wherein computer usable program code configured to compile, on the temporary virtual machine, includes computer usable program code configured to:
   decrypt the encrypted compiler on the temporary virtual machine to create a decrypted compiler; and
   compile the source code using the decrypted compiler.

9. The computer program product of claim 7, wherein the computer usable program code is further configured to verify the authenticity and integrity of the temporary virtual machine prior to decrypting the encrypted source code.

10. The computer program product of claim 9, wherein the computer usable program code configured to verify the authenticity and integrity of the temporary virtual machine includes computer usable program code configured to receive attestation of a boot process for the temporary virtual machine from a trusted platform module.

11. The computer program product of claim 7, wherein the computer usable program code is further configured to receive the encryption key from an escrow agent in response to an escrow release event.

12. The computer program product of claim 7, wherein the temporary virtual machine comprises a copy of a preexisting virtual machine.

13. An apparatus comprising:
   one or more processors;
   a computer readable storage medium having computer usable program code for the one or more processors embodied therewith, the computer usable program code comprising a computer usable program code configured to:
   a computer readable storage medium having computer usable program code for the one or more processors embodied therewith, the computer usable program code comprising a computer usable program code configured to:
   receive a software installation package, the software installation package including encrypted source code;
   receive an encryption key for decrypting the encrypted source code;
   establish a temporary virtual machine;
   decrypt, on the temporary virtual machine, the encrypted source code using the encryption key to create decrypted source code;
   compile, on the temporary virtual machine, the decrypted source code to create an application;
   transfer the application to an operating environment; and
   destroy the temporary virtual machine.

14. The apparatus of claim 13, wherein the software installation package further includes an encrypted compiler, and wherein computer usable program code configured to compile, on the temporary virtual machine, includes computer usable program code configured to:
   decrypt the encrypted compiler on the temporary virtual machine to create a decrypted compiler; and
   compile the source code using the decrypted compiler.

15. The apparatus of claim 13, wherein the computer usable program code is further configured to verify the authenticity and integrity of the temporary virtual machine prior to decrypting the encrypted source code.

16. The apparatus of claim 15, wherein the computer usable program code configured to verify the authenticity and integrity of the temporary virtual machine includes computer usable program code configured to receive attestation of a boot process for the temporary virtual machine from a trusted platform module.

17. The apparatus of claim 13, wherein the computer usable program code is further configured to receive the encryption key from an escrow agent in response to an escrow release event.

18. The apparatus of claim 13, wherein the temporary virtual machine comprises a copy of a preexisting virtual machine.

19. An apparatus comprising:
   one or more processors;
   a hypervisor executable by the one or more processors; and
   an installer executable by the one or more processors and configured to:
   receive a software installation package, the software installation package including encrypted source code;
   receive an encryption key for decrypting the encrypted source code; and
   cause the hypervisor to establish a temporary virtual machine, the temporary virtual machine configured to:
   decrypt the encrypted source code using the encryption key to create decrypted source code;
   compile the decrypted source code to create an application;
   transfer the application to an operating environment; and
   cause the hypervisor to destroy the temporary virtual machine.

20. The apparatus of claim 19, wherein the software installation package further includes an encrypted compiler, and wherein the temporary virtual machine is further configured to:
  decrypt the encrypted compiler to create a decrypted compiler; and
  compile the decrypted source code using the decrypted compiler.

21. The apparatus of claim 20, and further comprising firmware, the firmware having a compiler, the compiler to compile the decrypted source code.

22. The apparatus of claim 19, and further comprising a trusted platform module configured to verify the authenticity and integrity of the temporary virtual machine.

23. The apparatus of claim 22, wherein the trusted platform module comprises a virtual trusted platform module.

24. The apparatus of claim 19, wherein the installer is configured to receive the encryption key from an escrow agent.

25. The apparatus of claim 19, wherein the temporary virtual machine comprises a copy of a preexisting virtual machine.

* * * * *